United States Patent
Horn et al.

(10) Patent No.: US 10,140,067 B1
(45) Date of Patent: Nov. 27, 2018

(54) DATA MANAGEMENT FOR DATA STORAGE DEVICE WITH MULTIPLE TYPES OF NON-VOLATILE MEMORY MEDIA

(71) Applicant: Western Digital Technologies, Inc., Irvine, CA (US)

(72) Inventors: Robert L. Horn, Yorba Linda, CA (US); Robert M. Fallone, Newport Beach, CA (US); David Norman Steffen, Irvine, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 71 days.

(21) Appl. No.: 14/188,088

(22) Filed: Feb. 24, 2014

Related U.S. Application Data

(60) Provisional application No. 61/918,537, filed on Dec. 19, 2013.

(51) Int. Cl.
| | |
|---|---|
| *G06F 3/00* | (2006.01) |
| *G06F 13/28* | (2006.01) |
| *G06F 5/00* | (2006.01) |
| *G06F 3/06* | (2006.01) |

(52) U.S. Cl.
CPC .......... *G06F 3/0685* (2013.01); *G06F 3/0604* (2013.01); *G06F 3/0646* (2013.01)

(58) Field of Classification Search
CPC ..... G06F 3/0685; G06F 3/0604; G06F 3/0646
USPC ........................................................ 710/62
See application file for complete search history.

(56) References Cited

U.S. PATENT DOCUMENTS

| | | | |
|---|---|---|---|
| 6,856,556 B1 | 2/2005 | Hajeck | |
| 7,126,857 B2 | 10/2006 | Hajeck | |
| 7,430,136 B2 | 9/2008 | Merry, Jr. et al. | |
| 7,447,807 B1 * | 11/2008 | Merry ................... | G06F 3/0604 710/36 |
| 7,502,256 B2 | 3/2009 | Merry, Jr. et al. | |
| 7,509,441 B1 | 3/2009 | Merry et al. | |
| 7,596,643 B2 | 9/2009 | Merry, Jr. et al. | |
| 7,653,778 B2 | 1/2010 | Merry, Jr. et al. | |
| 7,685,337 B2 | 3/2010 | Merry, Jr. et al. | |
| 7,685,338 B2 | 3/2010 | Merry, Jr. et al. | |
| 7,685,374 B2 | 3/2010 | Diggs et al. | |
| 7,733,712 B1 | 6/2010 | Walston et al. | |
| 7,765,373 B1 | 7/2010 | Merry et al. | |
| 7,873,619 B1 * | 1/2011 | Faibish ............. | G06F 17/30091 707/705 |
| 7,898,855 B2 | 3/2011 | Merry, Jr. et al. | |
| 7,912,991 B1 | 3/2011 | Merry et al. | |
| 7,934,053 B2 | 4/2011 | Chen et al. | |
| 7,936,603 B2 | 5/2011 | Merry, Jr. et al. | |
| 7,962,685 B2 | 6/2011 | Cheung et al. | |
| 7,962,792 B2 | 6/2011 | Diggs et al. | |
| 8,078,918 B2 | 12/2011 | Diggs et al. | |
| 8,090,899 B1 | 1/2012 | Syu | |
| 8,095,851 B2 | 1/2012 | Diggs et al. | |

(Continued)

*Primary Examiner* — Farley Abad
*Assistant Examiner* — Getente A Yimer
(74) *Attorney, Agent, or Firm* — Barry IP Law, P.C.

(57) ABSTRACT

A data storage device (DSD) including a first non-volatile memory (NVM) media type for storing data and a second NVM media type for storing data. Metadata is obtained related to operation of the second NVM media type. The metadata is evaluated and data stored in the first NVM media type is managed based on the evaluated metadata.

30 Claims, 8 Drawing Sheets

(56) References Cited

U.S. PATENT DOCUMENTS

| | | |
|---|---|---|
| 8,108,692 B1 | 1/2012 | Merry et al. |
| 8,122,185 B2 | 2/2012 | Merry, Jr. et al. |
| 8,127,048 B1 | 2/2012 | Merry et al. |
| 8,135,903 B1 | 3/2012 | Kan |
| 8,151,020 B2 | 4/2012 | Merry, Jr. et al. |
| 8,161,227 B1 | 4/2012 | Diggs et al. |
| 8,166,245 B2 | 4/2012 | Diggs et al. |
| 8,243,525 B1 | 8/2012 | Kan |
| 8,254,172 B1 | 8/2012 | Kan |
| 8,261,012 B2 | 9/2012 | Kan |
| 8,296,625 B2 | 10/2012 | Diggs et al. |
| 8,312,207 B2 | 11/2012 | Merry, Jr. et al. |
| 8,316,176 B1 | 11/2012 | Phan et al. |
| 8,341,339 B1 | 12/2012 | Boyle et al. |
| 8,375,151 B1 | 2/2013 | Kan |
| 8,392,635 B2 | 3/2013 | Booth et al. |
| 8,397,107 B1 | 3/2013 | Syu et al. |
| 8,407,449 B1 | 3/2013 | Colon et al. |
| 8,423,722 B1 | 4/2013 | Deforest et al. |
| 8,433,858 B1 | 4/2013 | Diggs et al. |
| 8,443,167 B1 | 5/2013 | Fallone et al. |
| 8,447,920 B1 | 5/2013 | Syu |
| 8,458,435 B1 | 6/2013 | Rainey, III et al. |
| 8,478,930 B1 | 7/2013 | Syu |
| 8,489,854 B1 | 7/2013 | Colon et al. |
| 8,503,237 B1 | 8/2013 | Horn |
| 8,521,972 B1 | 8/2013 | Boyle et al. |
| 8,549,236 B2 | 10/2013 | Diggs et al. |
| 8,583,835 B1 | 11/2013 | Kan |
| 8,601,311 B2 | 12/2013 | Horn |
| 8,601,313 B1 | 12/2013 | Horn |
| 8,612,669 B1 | 12/2013 | Syu et al. |
| 8,612,804 B1 | 12/2013 | Kang et al. |
| 8,615,681 B2 | 12/2013 | Horn |
| 8,638,602 B1 | 1/2014 | Horn |
| 8,639,872 B1 | 1/2014 | Boyle et al. |
| 8,683,113 B2 | 3/2014 | Abasto et al. |
| 8,700,834 B2 | 4/2014 | Horn et al. |
| 8,700,950 B1 | 4/2014 | Syu |
| 8,700,951 B1 | 4/2014 | Call et al. |
| 8,706,985 B1 | 4/2014 | Boyle et al. |
| 8,707,104 B1 | 4/2014 | Jean |
| 8,713,066 B1 | 4/2014 | Lo et al. |
| 8,713,357 B1 | 4/2014 | Jean et al. |
| 8,719,531 B2 | 5/2014 | Strange et al. |
| 8,724,422 B1 | 5/2014 | Agness et al. |
| 8,725,931 B1 | 5/2014 | Kang |
| 8,745,277 B2 | 6/2014 | Kan |
| 8,751,728 B1 | 6/2014 | Syu et al. |
| 8,769,190 B1 | 7/2014 | Syu et al. |
| 8,769,232 B2 | 7/2014 | Suryabudi et al. |
| 8,775,720 B1 | 7/2014 | Meyer et al. |
| 8,782,327 B1 | 7/2014 | Kang et al. |
| 8,788,778 B1 | 7/2014 | Boyle |
| 8,788,779 B1 | 7/2014 | Horn |
| 8,788,880 B1 | 7/2014 | Gosla et al. |
| 8,793,429 B1 | 7/2014 | Call et al. |
| 2002/0194523 A1* | 12/2002 | Ulrich .............. G06F 17/30067 714/4.12 |
| 2003/0105918 A1* | 6/2003 | Plourde, Jr. ....... G06F 17/30017 711/112 |
| 2006/0080515 A1* | 4/2006 | Spiers ............... G06F 11/1441 711/162 |
| 2007/0088975 A1* | 4/2007 | Ashmore ........... G06F 11/2066 714/6.1 |
| 2007/0288692 A1 | 12/2007 | Bruce et al. |
| 2008/0209114 A1 | 8/2008 | Chow et al. |
| 2008/0215800 A1 | 9/2008 | Lee et al. |
| 2008/0244164 A1 | 10/2008 | Chang et al. |
| 2010/0174849 A1* | 7/2010 | Walston ............. G06F 12/0246 711/103 |
| 2010/0250793 A1 | 9/2010 | Syu |
| 2011/0099323 A1 | 4/2011 | Syu |
| 2011/0219149 A1* | 9/2011 | Lee .......................... G06F 3/00 710/15 |
| 2011/0283049 A1 | 11/2011 | Kang et al. |
| 2011/0307525 A1* | 12/2011 | Hanes .............. G06F 17/30235 707/803 |
| 2012/0260020 A1 | 10/2012 | Suryabudi et al. |
| 2012/0278531 A1 | 11/2012 | Horn |
| 2012/0284460 A1 | 11/2012 | Guda |
| 2012/0324191 A1 | 12/2012 | Strange et al. |
| 2013/0031298 A1 | 1/2013 | Tan et al. |
| 2013/0132638 A1 | 5/2013 | Horn et al. |
| 2013/0145106 A1 | 6/2013 | Kan |
| 2013/0290793 A1 | 10/2013 | Booth et al. |
| 2014/0047185 A1* | 2/2014 | Peterson ............... G06F 12/084 711/123 |
| 2014/0047190 A1* | 2/2014 | Dawkins ............ G06F 12/0813 711/136 |
| 2014/0059405 A1 | 2/2014 | Syu et al. |
| 2014/0101369 A1 | 4/2014 | Tomlin et al. |
| 2014/0115238 A1* | 4/2014 | Xi .......................... G06F 12/12 711/103 |
| 2014/0115427 A1 | 4/2014 | Lu |
| 2014/0133220 A1 | 5/2014 | Danilak et al. |
| 2014/0136753 A1 | 5/2014 | Tomlin et al. |
| 2014/0149826 A1 | 5/2014 | Lu et al. |
| 2014/0157078 A1 | 6/2014 | Danilak et al. |
| 2014/0181432 A1 | 6/2014 | Horn |
| 2014/0223255 A1 | 8/2014 | Lu et al. |

* cited by examiner

| Metadata | Data Management for Disk Media Type Based on Evaluation of Metadata Related to Operation of Solid State Media Type |
|---|---|
| Priority | Store Data in Disk Area with Higher Data Transfer Rate If Priority = 1 |
| Frequency | Store Data in Disk Area with Higher Data Transfer Rate If Frequency = 1 |
| Related LBAs | Store Data in Available Disk Area Physically Near Data for Related LBAs |
| Read/Write | Store Data in CMR Zone If Read/Write Below First Threshold<br>Store Data in SMR Zone If Read/Write Above Second Threshold |
| Last Access | Store Data in Disk Area with Higher Data Transfer Rate If Last Access Time Is Within a Recent Time Period |
| Sequential | Delay Performing Write Command for First Portion of Sequential Data If Write Command for Second Portion of Sequential Data Not Received<br>Store Data in SMR Zone If Sequentially Accessed for Reading or Writing |
| Related Event | Store Data in Disk Area with Higher Data Transfer Rate If Related Event = 1 |
| Media | Write Data with Higher Track Density If Data Already Stored in Solid State Media Type<br>Write Data with Lower Track Density If Data Not Already Stored in Solid State Media Type<br>Lower Vibration Threshold for Writing on Disk If Data Already Stored in Solid State Media Type |
| Fragmentation Level | Store Data in SMR Zone If Fragmentation Level in Solid State Media Type is Less Than Predetermined Level |

FIG. 2B

| LBA | Starting PBA | Extent Length | Last Access |
|---|---|---|---|
| 4,010 – 4,025 | 205 | 16 | 9/4/13 11:42:18 |
| 4,046 – 4,089 | 340 | 50 | 10/8/13 18:21:07 |
| 4,090 – 5,100 | 391 | 1,108 | 2/12/12 4:03:20 |
| 5,101 – 5,138 | 2,149 | 39 | 1/2/14 11:08:51 |

FIG. 3A

| Metadata | Data Management for Solid State Media Type Based on Evaluation of Metadata Related to Operation of Disk Media Type |
|---|---|
| Fragmentation Level | Store Data in Solid State Media Type If Fragmentation Level in Disk Media Greater Than Predetermined Level |
| Last Access | Store Data in Solid State Media Type If Last Access in Disk Media Is Within Recent Time Period |
| Sequential | Do Not Store Sequentially Accessed Data in Solid State Media Type If Data Stored Sequentially in Disk Media |

FIG. 3B

DATA MANAGEMENT FOR DATA STORAGE DEVICE WITH MULTIPLE TYPES OF NON-VOLATILE MEMORY MEDIA

CROSS-REFERENCE TO RELATED APPLICATION

This application claims the benefit of U.S. Provisional Application No. 61/918,537, filed on Dec. 19, 2013, which is hereby incorporated by reference in its entirety.

BACKGROUND

Data Storage Devices (DSDs) are often used to record data onto or to reproduce data from a Non-Volatile Memory (NVM) media. Some DSDs include multiple types of NVM media. For example, in the case of a Solid State Hybrid Drive (SSHD), a solid state NVM media such as a flash memory is used for storing data in addition to a second type of NVM media such as a rotating magnetic disk.

In many systems, a host will communicate with a DSD to store data in the DSD or to access data from the DSD. Such systems can include, for example, a computer system or other electronic device. When a host sends a command to store data in a DSD including both solid state NVM media and disk NVM media (i.e., a SSHD), the host may also provide hinting as to a priority of the data. A subsystem for the solid state NVM media may use this hinting to determine whether to store the data in the solid state NVM media. Although such hinting from a host can improve performance of the DSD, use of such hinting is generally limited to the subsystem for the solid state NVM media.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

FIG. 2B provides examples of data management performed based on the evaluation of metadata from FIG. 2A according to an embodiment.

FIG. 3A provides an example of a translation table maintained by a Hard Drive (HD) controller according to an embodiment.

FIG. 3B provides examples of data management performed based on the evaluation of metadata from FIG. 3A according to an embodiment.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

Figure 1:
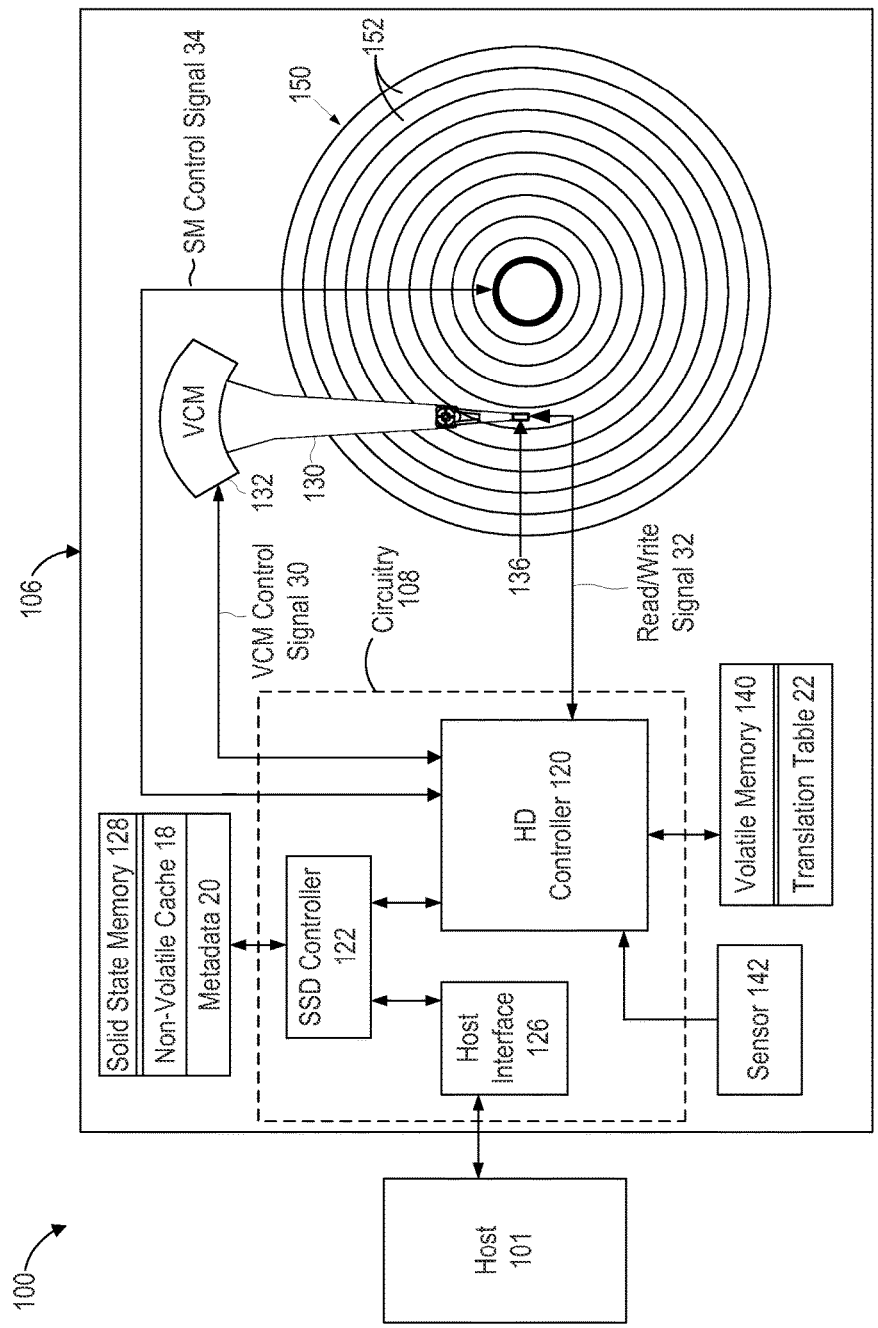
FIG. 1 is a block diagram depicting a Data Storage Device (DSD) according to an embodiment.

FIG. 1 illustrates a block diagram of Data Storage Device (DSD) 106 according to an embodiment. In the example embodiment of FIG. 1, DSD 106 includes both solid state memory 128 and disk 150 for storing data. In this regard, DSD 106 can be considered a Solid State Hybrid Drive (SSHD) in that it includes both solid state Non-Volatile Memory (NVM) media and disk NVM media. In other embodiments, each of disk 150 or solid state memory 132 may be replaced by multiple Hard Disk Drives (HDDs) or multiple Solid State Drives (SSDs), respectively, so that DSD 106 includes pools of HDDs and/or SSDs.

In the example of FIG. 1, DSD 106 is part of system 100 which includes host 101 and DSD 106. System 100 can be, for example, a computer system (e.g., desktop, mobile/laptop, tablet, smartphone, etc.) or other electronic device such as a digital video recorder (DVR). In this regard, system 100 may be a stand-alone system or part of a network, which can, for example, be a local or wide area network or the Internet. Those of ordinary skill in the art will appreciate that system 100 and DSD 106 can include more or less than those elements shown in FIG. 1 and that the disclosed processes may be implemented in other environments.

As shown in FIG. 1, DSD 106 includes circuitry 108 for controlling operation of DSD 106. In more detail, circuitry 108 includes Hard Disk (HD) controller 120, Solid State Device (SSD) controller 122, and host interface 126.

HD Controller 120 controls operations for magnetic disk 150 and can include circuitry such as one or more processors for executing instructions and can include a microcontroller, a Digital Signal Processor (DSP), an Application Specific Integrated Circuit (ASIC), a Field Programmable Gate Array (FPGA), hard-wired logic, analog circuitry and/or a combination thereof. In one implementation, HD controller 120 can include a System on a Chip (SoC).

SSD controller 122 controls operation for solid state memory 128 and can also include a microcontroller, a Digital Signal Processor (DSP), an Application Specific Integrated Circuit (ASIC), a Field Programmable Gate Array (FPGA), hard-wired logic, analog circuitry and/or a combination thereof. In one implementation, SSD controller 122 can include a System on a Chip (SoC).

Host interface 126 is configured to interface DSD 106 with host 101 and may interface according to a standard such as, for example, PCI express (PCIe), Serial Advanced Technology Attachment (SATA), or Serial Attached SCSI (SAS). Although FIG. 1 depicts the co-location of host 101 and DSD 106, in other embodiments the two need not be physically co-located. In such embodiments, DSD 106 may be located remotely from host 101 and interface with host 101 via a network interface.

In some embodiments, circuitry 108 or portions of circuitry 108 including HD controller 120, SSD controller 122, or host interface 126 may be combined into one component such as a System on a Chip (SoC).

In the embodiment of FIG. 1, host interface 126 receives data and commands from host 101 and provides the data and commands for both SSD controller 122 and HD controller 120 through SSD controller 122. Data and commands intended for HD controller 120 are passed through to HD controller 120 by SSD controller 122. In this regard, host 101 may provide hinting indicating whether certain data or commands are intended for SSD controller 122 or HD controller 120.

Disk 150 can serve as a first type of NVM media which stores data that can be retained across power cycles (i.e., after turning DSD 106 off and on). As shown in FIG. 1, a top surface of disk 150 includes a number of radially spaced, concentric tracks 152 for storing data. Each track 152 is divided into a number of sectors (not shown) that are spaced circumferentially along track 152. The sectors may be used to store user data or other information. The underside of disk 150 may have a similar arrangement of tracks and sectors for storing data. In other embodiments, disk 150 may form part of a disk pack which includes multiple disks that are radially aligned so as to rotate about a Spindle Motor (SM) (not shown).

Disk 150 may include Shingled Magnetic Recording (SMR) zones of overlapping tracks and/or Conventional Magnetic Recording (CMR) zones of non-overlapping tracks. In SMR zones, data is written in overlapping tracks on disk 150 to achieve a higher number of tracks on disk 150. The overlap in tracks, however, means that new writes to a previously overlapped track affects data written in the overlapping track. For this reason, tracks are usually sequentially written in SMR zones to protect previously written data. On the other hand, CMR zones do not include overlapping tracks and can therefore allow for non-sequential writing and rewriting without affecting previously written data.

As discussed in more detail below, the portions of disk 150 including SMR zones can serve as a first NVM media type and the portions of disk 150 including CMR zones can serve as a second NVM media type. In such embodiments, DSD 106 may or may not include solid state memory 128.

Head 136 is arranged to magnetically read data from and magnetically write data to a surface of disk 150 as it rotates about its center. In more detail, head 136 is located at the distal end of actuator 130 which is rotated by Voice Coil Motor 132 to position head 136 relative to the surface of disk 150. Head 136 may form part of a Head Stack Assembly (HSA) including multiple heads for reading data from other disk surfaces radially aligned with disk 150.

DSD 106 also includes volatile memory 140 which can include, for example, a DRAM. Data stored in volatile memory 140 can include data read from disk 150, data to be written to disk 150, and/or instructions for operation of DSD 106, such as DSD firmware.

As shown in FIG. 1, volatile memory 140 also stores translation table 22 which provides a mapping between Logical Block Addresses (LBAs) used by host 101 to address data and physical locations (e.g., Physical Block Addresses (PBAs)) referencing physical locations on disk 150 or in solid state memory 128. In one implementation, a back-up copy of a translation table is stored on disk 150 which is updated to account for changes to translation table 22 stored in volatile memory 140. In other embodiments, translation table 22 may be stored in a different location such as in solid state memory 128 or disk 150. Translation table 22 is described in more detail with reference to FIG. 3A below.

Sensor 142 is configured to detect an environmental condition such as an acceleration, vibration, or temperature of DSD 106. For example, sensor 142 may detect that DSD 106 is in a free-fall state or that DSD 106 is in a high vibration state. HD Controller 120 may use an input from sensor 142 to determine to delay writing data to disk 150 to prevent errors when writing or reading data, or to implement protective measures to protect data on disk 150. In other embodiments, sensor 142 may be part of host 101. In such embodiments, the input of sensor 142 may be received by HD controller 120 via host interface 126.

In operation, host interface 126 receives commands from host 101 for reading data from and writing data to NVM such as solid state memory 128 or disk 150. In response to a write command from host 101, HD controller 120 may buffer the data to be written for the write command in volatile memory 140.

For data to be written to disk 150, a read/write channel (not shown) of HD controller 120 encodes the buffered data into write signal 32 which is provided to head 136 for magnetically writing data to disk 150. A servo controller (not shown) of HD controller 120 positions head 136 using VCM control signal 30 and spins disk 150 using SM control signal 34.

In response to a read command for data stored on disk 150, HD controller 120 positions head 136 via the servo controller to magnetically read the data stored on disk 150. Head 136 sends the read data as read signal 32 to a read/write channel of HD controller 120 for decoding and the data is buffered in volatile memory 140 for transferring to host 101 via host interface 126.

DSD 106 also includes solid state memory 128 for storing data in a second NVM media type. While the description herein refers to solid state memory generally, it is understood that solid state memory may comprise one or more of various types of memory devices such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory (e.g., Single-Level Cell (SLC) memory, Multi-Level Cell (MLC) memory, or any combination thereof), NOR memory, EEPROM, Ferroelectric Memory (FeRAM), Magnetoresistive RAM (MRAM), other discrete NVM chips, or any combination thereof.

As shown in FIG. 1, solid state memory 128 stores Non-Volatile Cache (NVC) 18 and metadata 20. NVC 18 can be used to store data which may or may not also be stored on disk 150. For example, hinting from host 101 may indicate that certain data has a high priority such that it should be stored in both NVC 18 and on disk 150. Hinting from host 101 may indicate a somewhat lower priority for other data that should only be stored in NVC 18. Other data may have a lowest priority such that it should only be stored on disk 150 and some data may have no indication of a priority such that it can be stored in either NVM media type.

Solid state memory 128 also stores metadata 20 which includes information related to operation of solid state memory 128 such as information about data stored in solid state memory 128 or information obtained during operation of solid state memory 128. Metadata 20 is further described below with reference to FIG. 2A. In other embodiments, metadata 20 may be stored in other locations such as volatile memory 140 or on disk 150.

For data to be stored in solid state memory 128, SSD controller 122 receives data from host interface 126 and may buffer the data in volatile memory 140 or in a volatile memory of SSD controller 122. In one implementation, the data is then encoded into charge values for charging cells (not shown) of solid state memory 128 to store the data.

In response to a read command for data stored in solid state memory 128, SSD controller 122 in one implementation reads current values for cells in solid state memory 128 and decodes the current values into data that can be transferred to host 101. Such data may be buffered by SSD controller 122 before transferring the data to host 101 via host interface 126.

Figure 2A:
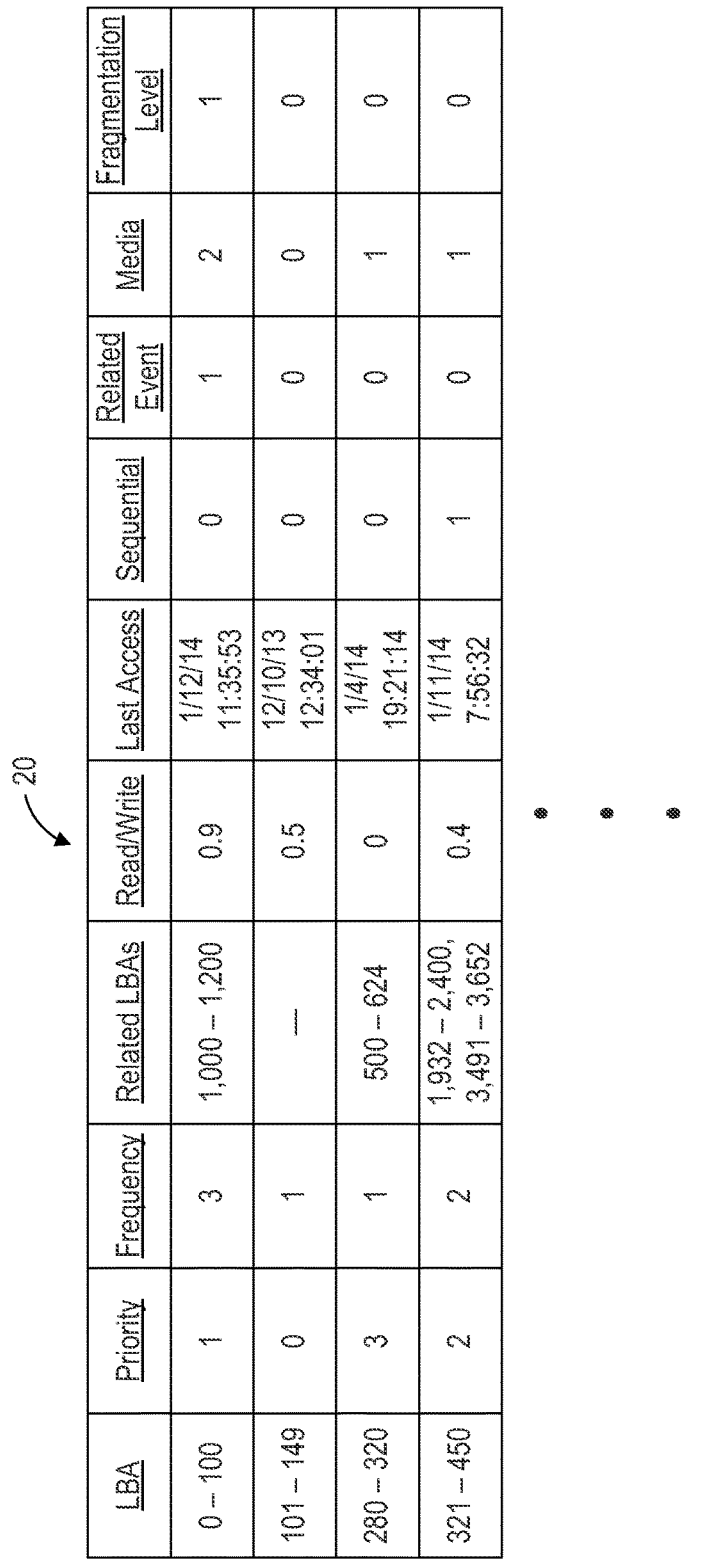
FIG. 2A provides an example of metadata obtained by a Solid State Device (SSD) controller according to an embodiment.

FIG. 2A provides an example of metadata 20, which has been obtained by SSD controller 122 according to an embodiment. In FIG. 2A, metadata 20 includes address ranges with different additional types of metadata associated with the data for each address range. The term "metadata" is used generally herein to include information related to operation of a storage media such as information about data stored in the storage media or information obtained during operation of the storage media. Metadata can, for example, indicate a location, structure, history, or contents of data stored in a storage media or can indicate an environmental condition or state of the storage media during operation.

In the embodiment of FIG. 2A, the address ranges are LBA ranges that are used by host 101 to refer to and organize data. The data for each LBA range may or may not be stored in solid state memory 128. In this regard, SSD controller 122 may also include metadata in metadata 20 for data stored in disk 150.

As shown in FIG. 2A, metadata 20 includes an LBA range, a priority level, a frequency, ranges of related LBAs, a read/write ratio, a time of last access, a sequential indicator, a related event indicator, a media indicator, and a fragmentation level. SSD controller 122 may obtain metadata 20 by collecting, learning or generating metadata for the addressed data. SSD controller 122 may also maintain metadata 20 by updating metadata 20. In other embodiments, metadata 20 may include different metadata than what is shown in FIG. 2A.

The priority level indicates a priority for the data. Such a priority level can be collected by SSD controller 122 from hinting provided by host 101 as discussed above. In the example of FIG. 2A, a priority level of 1 indicates a highest priority, a priority level of 2 indicates a medium priority, and a priority level of 3 indicates a lowest priority. A priority level of 0 indicates that there is no priority level associated with the data.

The frequency in metadata 20 indicates how often the associated data is accessed for reading and writing, with a frequency of 1 indicating that the data is accessed frequently, a frequency of 2 indicating a medium access frequency, and a frequency of 3 indicating that the data is accessed infrequently. SSD controller 122 may learn the frequency metadata by tracking how often the associated data is accessed. In this regard, the frequency metadata can be learned for data stored in solid state memory 128, disk 150, SMR zones, CMR zones, or for all of these NVM media types.

The related LBAs can include LBA ranges that are temporally related or otherwise related to the associated data. For example, SSD controller 122 may learn or determine that certain LBA ranges are usually accessed shortly before or shortly after receiving a command for the associated data. In another example, the related LBAs may correspond to other data used in the same file as the associated data.

SSD controller 122 also generates a read/write ratio which provides the ratio of times that the associated data is read to the times that the associated data is written. In other embodiments, metadata 20 may also include a read count or read frequency and/or a write count or a write frequency.

The last access time metadata in metadata 20 indicates the last time that the associated data was read or written. SSD controller 122 may keep track of these access times for data stored in solid state memory 128, disk 150, or for both types of NVM media.

In the example of FIG. 2A, SSD controller 122 also determines whether the referenced data is sequentially accessed for reading or writing in the NVM media. For example, the sequential indicator of 1 listed for the associated data of LBA range 321 to 450 indicates that the associated data is sequentially accessed. In other implementations, a sequential indicator may indicate the result of a stream detection logic of circuitry 108.

The related event indicator of metadata 20 can indicate a temporal relation to an event of DSD 106. For example, a related event indicator of 1 for the associated data of LBAs 0 to 100 can indicate that this data is accessed within a certain amount of time from powering DSD 106 on or off.

The media indicator of metadata 20 indicates whether the associated data is stored in solid state memory 128, disk 150, or in both NVM media types. In the example of FIG. 2A, a media indicator of 2 indicates that the data is stored in both solid state memory 128 and disk 150, a media indicator of 1 indicates that the data is only stored in disk 150, and a media indicator of 0 indicates that the data is only stored in solid state memory 128. SSD controller 122 may generate this metadata by keeping track of where different write commands from host 101 are directed and updating metadata 20 to reflect various transfers of data between solid state memory 128 and disk 150 (e.g., data migration).

The fragmentation level of metadata 20 can indicate how fragmented the data is in its storage in solid state memory 128. For example, a fragmentation level of 1 for the associated data of LBAs 0 to 100 can indicate that this data is physically located in different areas of solid state memory 128.

As discussed in more detail below with reference to FIGS. 2B and 6 below, the metadata of metadata 20 related to operation of solid state memory 128 (one NVM media type) can be used to manage data stored in disk 150 (a different NVM media type). For example, the foregoing metadata of metadata 20, or portions thereof, which are obtained by SSD controller 122 can be used by HD controller 120 to determine a physical location on disk 150 at which to store data, whether to delay storing data on disk 150, whether to store data on disk 150 during a particular environmental condition, or whether to adjust a track density for writing data on disk 150.

FIG. 2B provides examples of data management performed by HD controller 120 based on the evaluation of the metadata from FIG. 2A according to an embodiment. As shown in FIG. 2B, data associated with a high priority level may be located by HD controller 120 in areas of disk 150 with a higher data transfer rate, such as toward an outer diameter of disk 150. This can ordinarily allow for quicker access of higher priority data. On the other hand, data associated with a lower priority level can be located in areas of disk 150 having a lower data transfer rate.

The frequency of metadata 20 can be used by HD controller 120 to determine a location for storing the associated data on disk 150. In the example of FIG. 2B, data that is frequently accessed (i.e., frequency=1) for reading or writing is stored in an area of disk 150 with a higher data transfer rate. This can ordinarily provide for a better overall performance for a time to access data from disk 150 since more frequently accessed data can be accessed more quickly in an area of higher data transfer. Similarly, data associated with a lower frequency of access can be stored in areas of disk 150 with a lower data transfer rate such as toward an inner diameter of disk 150.

The related LBAs from metadata 20 can be used to determine a location for storing data on disk 150 by storing the data in an available area of disk 150 that is physically near the related data associated with the related LBAs. As discussed above, the related data may be related in temporal proximity to accessing the data or may be otherwise related to the data being stored such as being part of the same file.

The read/write ratio can be used by HD controller 120 to determine whether to write data in a SMR zone of overlapping tracks or in a CMR zone of non-overlapping tracks. As noted above, data is written in overlapping tracks in SMR zones to achieve a higher number of tracks on disk 150. The overlap in tracks, however, means that new writes to a previously overlapped track affects data written in the overlapping track. For this reason, tracks are usually sequentially written in groups of tracks or zones of tracks to protect previously written data.

In the example of FIG. 2B, HD controller 120 stores data in a CMR zone of non-overlapping tracks to facilitate rewriting of the data if the read/write ratio is below a first threshold. On the other hand, data associated with a read/write ratio above a second threshold can be stored in an SMR zone of overlapping tracks since this data is less frequently rewritten when compared to how often it is read.

The last access time metadata in metadata 20 can be used by HD controller 120 to store data that has been accessed for reading or writing within a recent time period in areas of disk 150 with a higher data transfer rate. Since more recently accessed data may be more likely to be accessed again soon, locating the more recently accessed data in locations on disk 150 with a higher data transfer rate can often improve a performance time in accessing data.

HD controller 120 may also use a sequential indicator of metadata 20 to determine whether to store data in an SMR zone or a CMR zone on disk 150. If data is often sequentially accessed for reading or writing, HD controller 120 may store the data in an SMR zone on disk 150. The sequential indicator may also be used to delay writing a first portion of sequentially accessed data if a second portion of the sequentially accessed data has not yet been received. Such a delay can allow for performance of other isolated commands on disk 150 before receiving a command to write the second portion of the sequential data has been received. In this way, an overall performance of commands can be improved by handling the isolated commands before efficiently writing both portions of the sequential data as one write.

In the example of FIG. 2B, a related event indicator of 1 indicates that the associated data is accessed for reading or writing within a certain amount of time from powering DSD 106 on or off. HD controller 120 can evaluate the related event indicator to store such data in an area of disk 150 with a higher data transfer rate so as to allow for quicker reading or writing of the data near the time of the event.

As noted above, the media indicator of metadata 20 can affect a track how data is written to disk 150. In this regard, if the media indicator indicates that the data is already stored in solid state memory 128, HD controller 120 may not be as concerned with incurring errors when reading or writing the data to disk 150 since a back-up copy exists in solid state memory 128.

In the example of FIG. 2B, a track density for writing data on disk 150 can be adjusted based on whether the data is already stored in solid state memory 128. If the data is already stored in solid state memory 128, HD controller 120 may write the data with a higher track density which may have a higher risk of encountering an error when reading or writing the data as compared to writing the data with a lower track density. If the data is not already stored in solid state memory 128, HD controller 120 may be more cautious by writing the data with a lower track density to provide a lower likelihood of errors in accessing the data.

In another example, evaluation of the media indicator can result in setting a more lenient threshold for writing data during a particular environmental condition. In the example of FIG. 2B, if data to be written to disk 150 is already stored in solid state memory 128, HD controller 120 may lower a vibration threshold for performing writes so that the data is written to disk 150 even when an input from sensor 142 would otherwise prevent data to be written to disk 150.

HD controller may use the fragmentation level of metadata 20 to determine whether to store data on disk 150 in an SMR zone or in a CMR zone. In the example of FIG. 2B, HD controller 120 stores data associated with a fragmentation level less than a predetermined level in an SMR zone as opposed to a CMR zone since such sequentially written data can reduce a need for garbage collection in the SMR zone.

FIG. 3A provides an example of metadata obtained by HD controller 120 according to an embodiment. In the embodiment of FIG. 3A, translation table 22 can be used as metadata related to operation of disk 150 (one NVM media type) to manage data stored in solid state memory 128 (a different NVM media type). In other embodiments, translation table 22 may be used as metadata related to operation of SMR zones (one NVM media type) to manage data stored in CMR zones (a different NVM media type) or vice versa. In yet other embodiments, translation table 22 may be used as metadata related to operation of solid state memory 128 (one NVM media type) to manage data stored in disk 150 (a different NVM media type).

In FIG. 3A, the metadata of translation table 22 is used primarily to map LBAs for associated data to PBAs corresponding to physical locations where the associated data is stored on disk 150. In some implementations, translation table 22 is used as part of an indirection process for SMR zones on disk 150. When data is updated for a particular LBA, the update is often written in a different location on disk 150 than where the data for the LBA was previously written rather than rewriting an entire SMR zone of overlapping tracks. A translation table, such as translation table 22, can be used to keep track of where the current versions of the data are stored for a particular LBA.

As shown in FIG. 3A, translation table 22 includes an LBA range, a PBA starting address, an extent length, and a last access time. The metadata of translation table 22 may vary in other embodiments. For example, in one embodiment, translation table 22 may include an ending PBA instead of an extent length or may include a PBA range instead of a starting PBA and an extent length. Other embodiments may indicate individual LBAs as opposed to LBA ranges. In yet other embodiments, the last access time may be omitted.

The LBA range in translation table 22 is associated with data addressed by the LBAs in the range. The starting PBA indicates a physical location on disk 150 where data for the LBA range begins. The extent length indicates a number of PBAs from the starting PBA where the associated data for the LBA range is stored. The last access time indicates a time when the associated data for the LBA range was last read or written on disk 150. In other implementations, the last access time may only refer to a last time that the associated data was written on disk 150.

HD controller 120 maintains translation table 22 in volatile memory 140 to keep track of the changes made to the data stored on disk 150. As noted above, translation table 22 may also be stored, or alternatively stored, in solid state memory 128 or disk 150.

As discussed in more detail below with reference to FIGS. 3B and 6, the metadata of translation table 22 related to operation of disk 150 (one NVM media type) can be used to manage data stored in solid state memory 128 (a different NVM media type). The metadata of translation table 22 can be used by SSD controller 122 to determine, for example, how recently certain data was read or written on disk 150, how fragmented certain data may be on disk 150, or what other data was accessed around the same time as other data. SSD controller 122 may use this information to update metadata 20 or to manage the storage of data in solid state memory 128. For example, metadata of translation table 22 that is obtained by HD controller 120 can be used by SSD controller 122 to determine whether to store a copy of the associated data in solid state memory 128 or whether to delay storing certain newly received data in solid state memory 128.

FIG. 3B provides examples of data management performed by SSD controller 122 based on the evaluation of metadata from FIG. 3A according to an embodiment.

As shown in FIG. 3B, SSD controller 122 may evaluate the starting PBA and extent length for an LBA range to determine a fragmentation level for the data associated with the LBA range. Based on such an evaluation, SSD controller 122 may store data that is more fragmented in solid state memory 128 since such fragmented data can ordinarily be accessed quicker from solid state memory 128 than from disk 150.

If the metadata from translation table 22 indicates that particular data has been accessed for reading or writing from disk 150 within a recent time period, SSD controller 122 may store the data in solid state memory 128 since it may be more likely to be accessed again soon.

SSD controller 122 may also evaluate the last access times for multiple LBA ranges to determine whether particular data is often sequentially accessed. Such metadata can be used by controller 122, for example, to determine not to store data that is sequentially accessed in solid state memory 128 if the sequentially accessed data is already stored in sequential physical locations in disk 150 since there may not be much improvement in performance by relocating such data to solid state memory 128.

Figure 4:
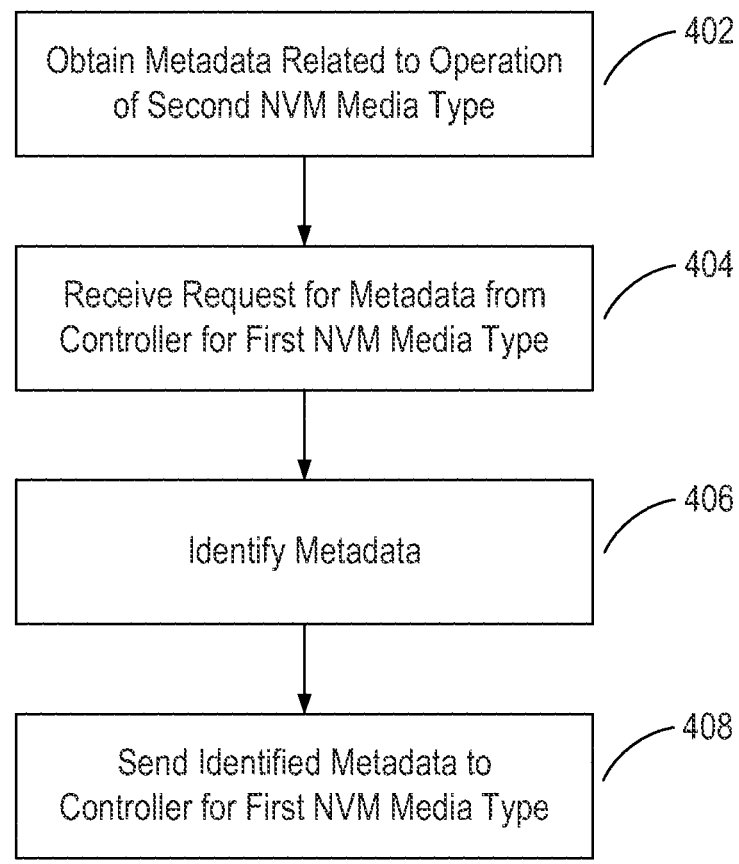
FIG. 4 is a flowchart for a requested metadata sharing process according to an embodiment.

FIG. 4 is a flowchart for a requested metadata sharing process which can be performed by circuitry 108 of DSD 106 according to an embodiment. In the following description of FIG. 4, the first NVM media type refers to either disk 150 or solid state memory 128, and the second NVM media type refers to the other NVM media type (i.e., the other of solid state memory 128 or disk 150).

In block 402, metadata is obtained by a controller for the second NVM media type in relation to operation of the second NVM media type. In one implementation, SSD controller 122 obtains metadata 20 in operation of solid state memory 128. In another implementation, HD controller 120 obtains the metadata of translation table 22 in operation of disk 150.

In block 404, a controller for the second NVM media type receives a request for metadata from the controller for the first NVM media type. In some embodiments, the request may take the form of a notification of a certain action being performed by the controller of the first NVM media type. For example, HD controller 120 may notify SSD controller 122 that it is performing a write command for data having a certain LBA range. This would then be treated by SSD controller 122 as a request for metadata associated with the LBA range. In another example, HD controller 120 may notify SSD controller 122 that it is performing a garbage collection process for a particular LBA range on disk 150.

In some implementations, the controller for the first NVM media type may specify certain types of metadata such as a priority level and a frequency. In other implementations, the controller for the first NVM media type may only provide an address or addresses for the data to request any associated metadata maintained by the controller of the second NVM media type.

In block 406, the controller for the second NVM media type identifies the metadata for data corresponding to the request for metadata. This can include identifying the address or addresses (e.g., an LBA or LBA range) associated with the requested metadata. In the case where SSD controller 122 is the controller for the second NVM media type, SSD controller 122 may compare the address or addresses identified with the LBA range entries in metadata 20. In the case where HD controller 120 is the controller for the second NVM media type, HD controller 120 may compare the address or addresses identified with the LBA range entries in translation table 22.

In block 408, the controller for the second NVM media type sends the metadata identified in block 406 to the controller for the first NVM media type. As discussed below with reference to the data management process of FIG. 6, the controller for the first NVM media type can use the metadata sent in block 408 to manage data stored in the first NVM media type.

In some embodiments, the sharing of metadata between controllers can be bidirectional. In other words, in some instances HD controller 120 may provide metadata to SSD controller 122, and in other instances SSD controller 122 may provide metadata to HD controller 120. In other embodiments, the direction of providing metadata may occur in only one direction, such as always from SSD controller 122 to HD controller 120.

Figure 5:
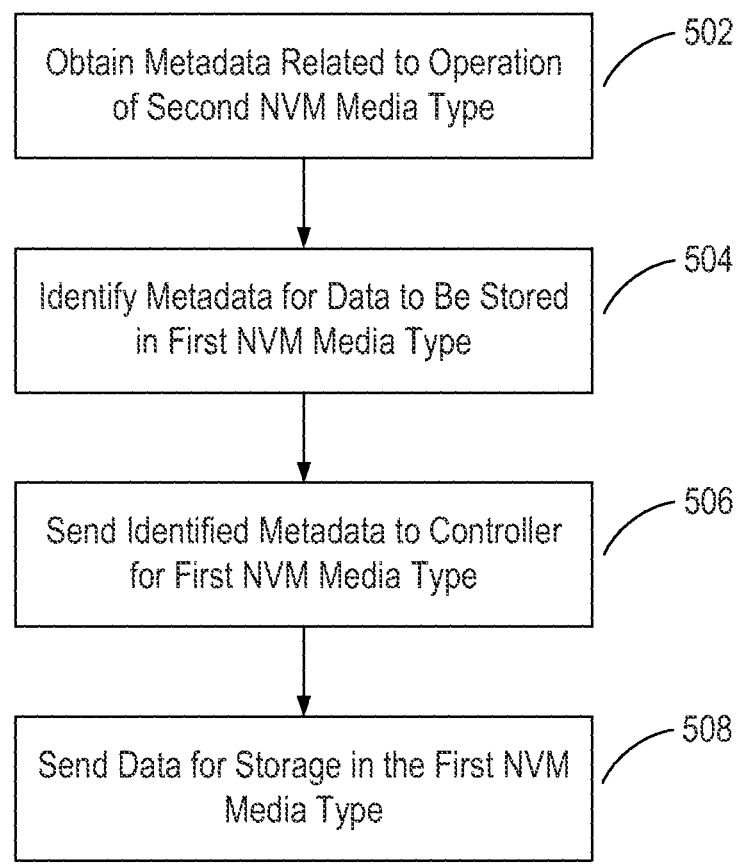
FIG. 5 is a flowchart for a pushed metadata sharing process according to an embodiment.

FIG. 5 is a flowchart for a pushed metadata sharing process that can be performed by circuitry 108 according to an embodiment. In block 502, metadata is obtained by a controller for the second NVM media type in relation to operation of the second NVM media type. In one implementation, SSD controller 122 obtains metadata 20 in operation of solid state memory 128. In another implementation, HD controller 120 obtains the metadata of translation table 22 in operation of disk 150.

In block 504, the controller for the second NVM media type identifies metadata for data to be stored in the first NVM media type. This can result, for example, from the controller for the second NVM media type receiving a command from host 101 to write particular data in the first NVM media type or a data migration process to store data currently stored in the second NVM media type in the first NVM media type. As with block 406 of FIG. 4, the metadata may be identified using an address or addresses (e.g., an LBA or LBA range) associated with the data to be stored in the first NVM media type. In the case where SSD controller 122 is the controller for the second NVM media type, SSD controller 122 may compare the address or addresses identified with the LBA range entries in metadata 20. In the case where HD controller 120 is the controller for the second NVM media type, HD controller 120 may compare the address or addresses identified with the LBA range entries in translation table 22.

In block 506, the controller for the second NVM media type sends the metadata identified in block 504 to the controller for the first NVM media type. In addition, the controller for the second NVM media type in block 508 sends the data or a command for the data to be stored to the controller for the first NVM media type. As discussed below with reference to the data management process of FIG. 6, the controller for the first NVM media type can use the metadata sent in block 506 to manage the data stored in the first NVM media type.

As with the metadata sharing process of FIG. 4, the metadata sharing process of FIG. 5 can also be bidirectional between controllers for the first and second NVM media types. In other embodiments, the controller for the second NVM media type may only provide metadata to the controller for the first NVM media type.

Figure 6:
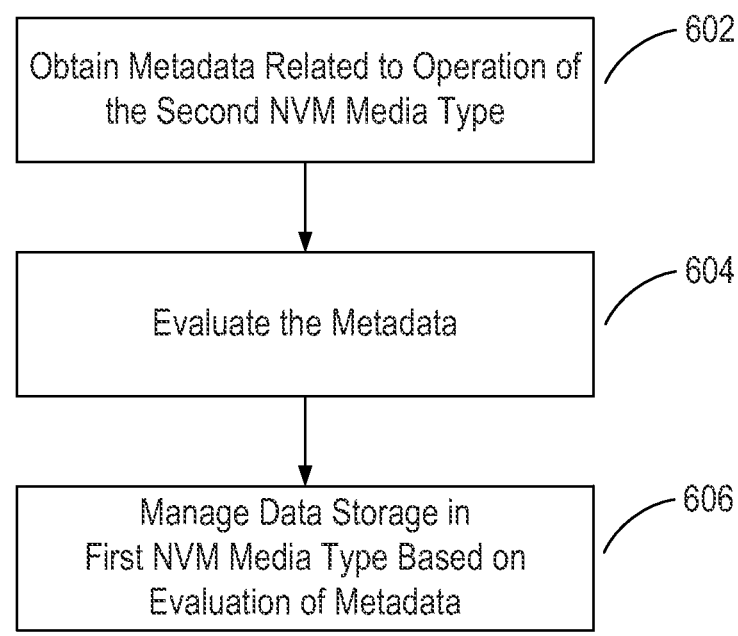
FIG. 6 is a flowchart for a data management process according to an embodiment.

FIG. 6 is a flowchart for a data management process that can be performed by circuitry 108 according to an embodiment. In the following description of FIG. 6, the first NVM media type can refer to any one of disk 150, solid state memory 128, SMR zones on disk 150, or CMR zones on disk 150. The second NVM media type refers to an NVM media type different from the first NVM media type.

In addition, the process of FIG. 6 may be performed by a controller for a first NVM media type or may be performed by a controller for both the first and second NVM media types. For example, in some implementations, a single controller may operate both disk 150 and solid state memory 128. In another example, HD controller 120 may both obtain metadata related to operation of a second NVM media type (e.g., SMR zones on disk 150) and manage data storage in a second NVM media type (e.g., CMR zones on disk 150) based on the evaluation of the obtained metadata.

In block 602, circuitry 108 obtains metadata related to the operation of the second NVM media type. The metadata obtained in block 602 may have been in response to a request for metadata as in the requested metadata sharing process of FIG. 4 or the metadata may have been obtained in block 602 as a result of a pushing metadata process as in FIG. 5. In embodiments where a single controller controls multiple types of NVM media, the controller may obtain metadata in block 602 on its own without having to receive the metadata from another controller.

In block 604, circuitry 108 evaluates the metadata obtained in block 602. In one implementation, HD controller 120 may evaluate metadata received from SSD controller 122 including a priority level, a frequency, related LBAs, a read/write ratio, a last access time, a sequential indicator, a related event indicator, and a fragmentation level. In another implementation, SSD controller 122 may evaluate metadata received from HD controller 120 including whether an LBA range for the associated data exists in translation table 22, an extent length for an LBA range, the time when data for an LBA range was last accessed, or LBA ranges in translation table 22 adjacent to a particular LBA range.

In yet another implementation, HD controller 120 may evaluate metadata associated with data stored in either a CMR or SMR zone to manage data in the other type of zone. In such an implementation, HD controller 120 may evaluate metadata from translation table 22 to determine if, for example, less recently accessed data should be moved from a CMR zone to an SMR zone, whether data that is not often sequentially accessed should be moved from a CMR zone to an SMR zone, or whether to move data that is more fragmented from an SMR zone to a CMR zone.

In block 606, circuitry 108 manages data storage in the first NVM media type based on the evaluation of metadata in block 604. In one example, HD controller 120 may determine to locate the data to be written in a particular location on disk 150 having a higher data transfer rate (e.g., near the outer diameter of disk 150) if the priority level from metadata 20 is high or the frequency is high so that such data can be accessed quickly. In another example, HD controller 120 may locate data with a related event indicator from metadata 20 indicating that the associated data is used soon after a startup of DSD 106 in an area of disk 150 with a high data transfer rate so that such data can be quickly accessed after startup. HD controller 120 may also store data associated with a recent last access time from metadata 20 in a location on disk 150 with a higher data transfer rate, since this data may be more likely to be soon accessed again. HD controller 120 may also locate data with related LBAs in metadata 20 physically near the related LBAs on disk 150 so as to conserve motion of head 136.

In another example, HD controller 120 may locate data associated with a high read/write ratio from metadata 20 in an SMR zone of overlapping tracks since such data is read more frequently than it is written. On the other hand, data that has a lower read/write ratio may be stored in a CMR zone of non-overlapping tracks since such data may be rewritten more often. In addition, data indicated by evaluated metadata as having a low fragmentation level may also be stored in an SMR zone to reduce the amount of garbage collection needed in the SMR zone.

In other examples, HD controller 120 may use a media indicator from metadata 20 to determine how to write data on disk 150. In this regard, if the media indicator indicates that the data is already stored in solid state memory 128, HD controller 120 may not be as concerned with incurring errors when reading or writing the data to disk 150 since a back-up copy exists in solid state memory 128.

Such examples of using a media indicator include setting a more lenient threshold for writing data during a particular environmental condition. In one example, if data to be written to disk 150 is already stored in solid state memory 128, HD controller 120 may lower a vibration threshold for performing writes so that the data is written to disk 150 even when an input from sensor 142 would otherwise prevent data to be written to disk 150. In another example, if data is already stored in solid state memory 128, HD controller 120 may write the data with a higher track density even though data written at the higher track density may be more susceptible to read and write errors than data written with a lower track density.

In another example where metadata from SSD controller 122 can affect how HD controller 120 writes data to disk 150, a sequential indicator from metadata 20 may indicate that data to be written to disk 150 is usually sequentially accessed for reading or writing. If HD controller 120 only receives a command to write a first portion of this data, HD controller 120 may wait a certain amount of time before writing the first portion to see if a command for writing the remaining portion is received. This may allow HD controller 120 to temporarily service other commands so that the writing of the first portion and the remaining portion can be performed more efficiently as a single sequential write on disk 150.

For its part, SSD controller 122 can manage data storage in solid state memory 128 based on metadata related to operation of disk 150. In one example, SSD controller may evaluate metadata received from HD controller 120 including an extent length for an LBA range to determine an amount of fragmentation for data stored in disk 150. SSD controller 122 may determine to store copies of data from disk 150 that are more fragmented to improve a performance of DSD 106 in accessing such fragmented data since accessing such fragmented data on disk 150 may incur a greater performance penalty.

In another example, SSD controller 122 may use the time when data for an LBA range was last accessed for reading or writing to determine whether to store the data in solid state memory 128. If the data was recently written to disk 150, SSD controller 122 can determine that such data is more likely to be accessed in the near future so that storage of the data in solid state memory 128 would improve a performance of DSD 106.

In yet another example, SSD controller 122 may use LBA ranges in translation table 22 adjacent to a particular LBA range to determine whether particular data is fragmented or if metadata 20 should be updated to reflect that certain data is related. The LBA ranges of translation table 22 may also provide SSD controller 122 with an indication of whether certain data is sequential. If so, SSD controller 122 may update metadata 20. SSD controller 122 may also determine that a copy of such sequential data should not be stored in solid state memory 128 since accessing such sequential data from solid state memory 128 would not provide enough of a performance improvement over accessing the data from disk 150.

By managing data stored in a first NVM media type based on the evaluation of metadata obtained relating to operation of a second NVM media type, it is ordinarily possible to better manage data stored in the first NVM media type using the metadata.

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes a processor or computer to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, and controllers described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The activities of a method or process described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable media, an optical media, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC).

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the scope of the present disclosure. The described embodiments are to be considered in all respects only as illustrative and not restrictive and the scope of the disclosure is, therefore, indicated by the following claims rather than by the foregoing description. All changes which come within the meaning and range of equivalency of the claims are to be embraced within their scope.

What is claimed is:

1. A system comprising:
    a disk for storing data;
    a solid state memory for storing data;
    a solid state device (SSD) controller configured to obtain metadata related to data stored in the solid state memory, wherein the metadata includes non-address metadata indicating at least one of a priority of the data, a frequency of access of the data, a last access time of the data, whether the data was accessed in temporal proximity to a powering on or powering off of the system, storage of the data in the solid state memory, a fragmentation level of the data, and that the data is often sequentially accessed for reading or writing; and
    a hard disk (HD) controller configured to:
        evaluate the non-address metadata; and
        determine a location on the disk for storing the data based on the evaluation of the non-address metadata.

2. The system of claim 1, wherein the metadata includes addresses for other data related to the data, and wherein the HD controller is further configured to determine a location for storing the data on the disk based on the evaluation of the non-address metadata and the addresses for the other data.

3. The system of claim 1, wherein the non-address metadata includes at least one of a frequency indicator indicating how often the data is accessed for reading or writing and a last access time indicating when the data was last accessed for reading or writing, and wherein the HD controller is further configured to determine a location for storing the data on the disk based on the evaluation of at least one of the frequency indicator and the last access time.

4. The system of claim 1, wherein the metadata includes temporally related addresses for other data accessed for reading or writing in temporal proximity to accessing the data, and wherein the HD controller is further configured to determine a location for storing the data on the disk based on the evaluation of the non-address metadata and the temporally related addresses.

5. The system of claim 1, wherein the non-address metadata indicates that the data is stored in the solid state memory, and wherein the HD controller is further configured to modify an environmental threshold such that the data is stored on the disk when an environmental condition would otherwise prevent the data from being stored on the disk without modifying the environmental threshold.

6. The system of claim 1, wherein the non-address metadata indicates that the data is stored in the solid state memory, and wherein the HD controller is further configured to adjust a track density for writing the data on the disk based on the evaluation of whether the data is stored in the solid state memory.

7. The system of claim 1, wherein the non-address metadata includes a sequential indicator indicating that the data is often sequentially accessed for reading or writing, and wherein the HD controller is further configured, based on the evaluation of the sequential indicator, to delay performing a write command to store a first portion of the data on the disk if a write command to store a second portion of the data has not yet been received by the system.

8. The system of claim 1, wherein the disk includes at least one zone of overlapping tracks and at least one zone of non-overlapping tracks, and wherein the HD controller is further configured to store the data in the at least one zone of overlapping tracks or in the at least one zone of non-overlapping tracks based on the evaluation of the non-address metadata.

9. The system of claim 8, wherein the non-address metadata includes a ratio comparing how frequently the data is read with how frequently the particular data is written, and wherein the HD controller is further configured to store the data in the at least one zone of overlapping tracks or in the at least one zone of non-overlapping tracks based on the evaluation of the ratio.

10. The system of claim 8, wherein the non-address metadata includes a sequential indicator indicating whether the data is often sequentially accessed for reading or writing, and wherein the HD controller is further configured to store the data in the at least one zone of overlapping tracks or in the at least one zone of non-overlapping tracks based on the evaluation of the sequential indicator.

11. The system of claim 1, wherein the metadata includes metadata from a translation table mapping logical block addresses (LBAs) to physical addresses in the solid state memory.

12. The system of claim 1, wherein the non-address metadata indicates a fragmentation level of the data in its storage in the solid state memory, and wherein the HD controller is further configured to determine to store the data in the disk based on the evaluation of the fragmentation level of the data in its storage in the solid state memory.

13. The system of claim 1, wherein the non-address metadata includes a time when the data was last accessed for reading or writing in the solid state memory, and wherein the HD controller is further configured to determine whether to store the data in the disk based on the evaluation of the time when the data was last accessed for reading or writing in the solid state memory.

14. The system of claim 1, wherein the non-address metadata indicates whether the data is often sequentially accessed for reading or writing in the solid state memory, and wherein the HD controller is further configured to determine whether to store the data in the disk based on the evaluation of whether the data is often sequentially accessed for reading or writing in the solid state memory.

15. A method for managing data stored in a data storage device (DSD), the method comprising:
using a solid state device (SSD) controller of the DSD to obtain metadata related to data stored in a solid state memory of the DSD, wherein the metadata includes non-address metadata indicating at least one of a priority of the data, a frequency of access of the data, a last access time of the data, whether the data was accessed in temporal proximity to a powering on or powering off of the DSD, storage of the data in the solid state memory, a fragmentation level of the data, and that the data is often sequentially accessed for reading or writing; and
using a hard disk (HD) controller of the DSD to:
evaluate the non-address metadata; and
determine a location on a disk of the DSD for storing the data based on the evaluation of the non-address metadata.

16. The method of claim 15, wherein the metadata includes addresses for other data related to the data, and wherein the method further comprises determining a location for storing the data on the disk based on the evaluation of the non-address metadata and the addresses for the other data.

17. The method of claim 15, wherein the non-address metadata includes at least one of a frequency indicator indicating how often the data is accessed for reading or writing and a last access time indicating when the data was last accessed for reading or writing, and wherein the method further comprises determining a location for storing the data on the disk based on the evaluation of at least one of the frequency indicator and the last access time.

18. The method of claim 15, wherein the metadata includes temporally related addresses for other data accessed for reading or writing in temporal proximity to accessing the data, and wherein the method further comprises determining a location for storing the data on the disk based on the evaluation of the non-address metadata and the temporally related addresses.

19. The method of claim 15, wherein the non-address metadata indicates that the data is stored in the solid state memory, and wherein the method further comprises modifying an environmental threshold such that the data is stored on the disk when an environmental condition would otherwise prevent the data from being stored on the disk without modifying the environmental threshold.

20. The method of claim 15, wherein the non-address metadata indicates that the data is stored in the solid state memory, and wherein the method further comprises adjusting a track density for writing the data on the disk based on the evaluation of whether the data is stored in the solid state memory.

21. The method of claim 15, wherein the non-address metadata includes a sequential indicator indicating that the data is often sequentially accessed for reading or writing, and wherein the method further comprises, based on the evaluation of the sequential indicator, delaying performing a write command to store a first portion of the data on the disk if a write command to store a second portion of the data has not yet been received by the DSD.

22. The method of claim 15, wherein the disk includes at least one zone of overlapping tracks and at least one zone of non-overlapping tracks, and wherein the method further comprises storing the data in the at least one zone of overlapping tracks or in the at least one zone of non-overlapping tracks based on the evaluation of the non-address metadata.

23. The method of claim 22, wherein the non-address metadata includes a ratio comparing how frequently the data is read with how frequently the data is written, and wherein the method further comprises storing the data in the at least one zone of overlapping tracks or in the at least one zone of non-overlapping tracks based on the evaluation of the ratio.

24. The method of claim 22, wherein the non-address metadata includes a sequential indicator indicating whether the data is often sequentially accessed for reading or writing, and wherein the method further comprises storing the data in the at least one zone of overlapping tracks or in the at least one zone of non-overlapping tracks based on the evaluation of the sequential indicator.

25. The method of claim 15, wherein the metadata includes metadata from a translation table mapping logical block addresses (LBAs) to physical addresses in the solid state memory.

26. The method of claim 15, wherein the non-address metadata indicates a fragmentation level of the data in its storage in the solid state memory, and wherein the method further comprises determining to store the data in the disk based on the evaluation of the fragmentation level of the data in its storage in the solid state memory.

27. The method of claim 15, wherein the non-address metadata includes a time when the data was last accessed for reading or writing in the solid state memory, and wherein the method further comprises determining whether to store the data in the disk based on the evaluation of the time when the data was last accessed for reading or writing in the solid state memory.

28. The method of claim 15, wherein the non-address metadata indicates whether the data is often sequentially accessed for reading or writing in the solid state memory, and wherein the method further comprises determining whether to store the data in the disk based on the evaluation of whether the data is often sequentially accessed for reading or writing in the solid state memory.

29. The system of claim 1, wherein the metadata relates to first data stored in the solid state memory, and wherein the HD controller is further configured to determine a location on the disk for storing second data different from the first data using the metadata.

30. The method of claim 15, wherein the metadata relates to first data stored in the solid state memory, and wherein the method further comprises determining a location on the disk for storing second data different from the first data using the metadata.

* * * * *